United States Patent [19]

Mussler

[11] 4,229,508
[45] Oct. 21, 1980

[54] RESTORATION OF NICKEL-CADMIUM BATTERIES

[76] Inventor: George K. Mussler, 11 Beech Ct., Malverne, N.Y. 11565

[21] Appl. No.: 102,680

[22] Filed: Dec. 12, 1979

[51] Int. Cl.$^3$ ............................................. H01M 6/50
[52] U.S. Cl. .................................... 429/49; 429/222; 429/223; 429/120
[58] Field of Search .................. 429/49, 120, 222, 223

[56] References Cited

U.S. PATENT DOCUMENTS

| | | | |
|---|---|---|---|
| 2,689,322 | 9/1954 | Godshalk et al. | 429/49 X |
| 2,855,453 | 10/1958 | Eidensohn | 429/120 |
| 3,156,813 | 11/1964 | Trainor | 429/49 X |
| 3,723,187 | 3/1973 | Toydoka | 429/120 |
| 3,745,048 | 7/1973 | Dinkler et al. | 429/120 |
| 4,055,709 | 10/1977 | Medford | 429/49 |

*Primary Examiner*—Charles F. LeFevour
*Attorney, Agent, or Firm*—E. Janet Berry; Lawrence Rosen

[57] ABSTRACT

The invention resides in a process for restoration of nickel-cadmium batteries which are rechargeable. The battery is submersed in boiling water and is maintained therein for a period of time of approximately 15 to 20 minutes. The battery is removed from the boiling water and is immediately cooled to approximately room temperature. Preferably such cooling is effected by submersion of the battery in water at a temperature of from 45° to 50° F. in which water bath the battery is permitted to cool for a period of approximately 20 minutes. The battery is then in condition for electrical recharging.

4 Claims, No Drawings

RESTORATION OF NICKEL-CADMIUM BATTERIES

Background of the Invention

The present invention relates generally to batteries and more particularly to the restoration of rechargeable nickel-cadmium batteries.

It is well known that electric storage batteries require periodic restoration or rejuvenation when they fall below their rated e.m.f. production level. Such drop-off in e.m.f. level is occasioned most frequently by conversion of the anode and/or cathode material through either reduction or oxidation depending upon the composition of the electrodes and also upon the nature of the electrolyte. Less frequently the composition or concentration of the electrolyte will change, principally due to the presence of impurities therein, and such changes can also adversely affect the rated e.m.f. capacity of the battery.

It has been found that storage batteries utilizing an anode composed of nickel, a cathode composed of cadmium and an electrolyte consisting of a solution of potassium hydroxide possess relatively long operational longevity and require somewhat less care and maintenance than other storage batteries such as those of the lead-acid type. Consequently, the nickel-cadmium rechargeable battery has been widely accepted and performs well when employed as the power source in missles and in other aerospace components. Due to the relatively high cost of the materials in the nickel-cadmium battery it is important that a reliable and convenient method for restoration of such batteries be available and that such method be capable of a high degree of success with such batteries as have fallen below their rated e.m.f. capacities. Otherwise the battery must be discarded and has little if any value.

The most common process for restoration of rechargeable nickel-cadmium batteries involves electrical recharging of the battery with or without electrolyte replacement; however, many batteries which have fallen below their rated e.m.f. production level cannot be restored by this conventional technique or, if restored, are capable of performing at their rated e.m.f. value for only short periods of time as compared with fresh batteries. Other prior procedures for restoration of such rechargeable batteries are rather time consuming and complex. One other typical prior rejuvenation method is disclosed in U.S. Pat. No. 4,055,709 issued Oct. 25, 1977 to Robert C. Medford. This method requires discharging of the nickelcadmium cells, charging of the cells until equilibrium is reached, draining of the electrolyte from the cells, flushing of the cells with demineralized water in an ultrasonic bath, and addition of fresh electrolyte. It will be seen, therefore, that a process for restoration of rechargeable nickel-cadmium batteries which is simpel, convenient and does not require a lengthy period of time to execute is still urgently needed.

The principal object of the invention is to provide a process for the restoration of rechargeable nickel-cadmium batteries which can be carried out expeditiously and conveniently.

Another object of this invention is to provide a process for restoration of rechargeable nickel-cadmium batteries which assures a relatively high degree of success in rejuvenating such batteries to substantially their original rated e.m.f. production level and that such rejuvenated batteries will perform at or close to its rated e.m.f. level for a period of time reasonably approximating that of a fresh battery.

Other advantages and objects of the invention will become readily apparent to persons versed in the art to which the invention pertains from the ensuing description thereof.

Summary of the Invention

In accordance with the present invention there is provided a process for the restoration of rechargeable nickel-cadmium batteries in which the battery is cleaned, submersed in boiling water and maintained therein for a period of time within the approximate range of from 15 to 20 minutes. The battery is removed from the boiling water and is immediately cooled to approximately room temperature. Preferably such cooling is effected by submersion of the battery in water at a temperature of from 45° to 50° F. in which the battery is permitted to cool for a period of approximately 20 minutes. The battery is then in condition for electrical recharging.

Description of the Preferred Embodiments

The first step in the process of the invention is performance of a visual inspection of the battery to be restored. If it is ascertained that the battery has occasioned physical damage which may weaken the casing or housing thereof such as by having a crack or puncture therein the battery should not be subjected to the restoration procedure of the invention. Similarly, if the casing or housing of the battery has in any way been crushed it should not be used in the process of the invention. The terminals should be inspected for damage, and unless fully intact and undamaged the battery should not be used in the restoration process. Any significant corrosion of the battery also negates the value of the battery for restoration.

The battery to be restored should be reasonably clean and, if otherwise in satisfactory physical condition, cleaning should be conducted before subjecting the battery to the first step of the process of the invention.

The battery in relatively clean condition should be immersed in boiling water to a level which desirably completely covers the top of the battery. The battery should be maintained within the boiling water for a period of time within the approximate range of from 15 to 20minutes. The battery, at the conclusion of the initial heating step, should be removed from the boiling water and immediately cooled to approximately room temperature. Desirably such cooling is carried out by submersion in water maintained at a temperature below room temperature, preferably at a temperature between 45° to 50° F. The battery should be maintained within the water bath for a period of approximately 20 minutes or until it has been cooled to about room temperature. The battery at this point should no longer be hot to the touch. Also, an important function of the cooling step is to minimize chemical reaction between the electrolyte and otherwise chemically inactive components of the battery such as gaskets, air vent valves, spacers, supporting devices and the like. The battery is then in suitable condition for electrical recharging in conventional manner.

EXAMPLES

Four (4) nickel-cadmium batteries were removed from a calculator which was no longer operable in either AC adaptor or battery mode. The batteries were of Type AA Penlite. Removal of the batteries showed that no energy was being produced. The batteries exhibited no DC resistance, i.e. zero ohms. A vacuum tube voltmeter was employed to obtain the measurement. In order to establish that the calculator was operable except for the batteries fresh batteries were installed and the calculator functioned normally.

The four (4) batteries were placed in an aluminum tray containing water which was boiled for a period of approximately 15 minutes. It was observed that gas was evolved from the vent at the top of the batteries. It was also noted that a brownish precipitate was formed from certain of the batteries. After about 15 minutes the batteries were removed from the boiling water and submersed in a tray of cool water at a temperature of approximately 50° F. and kept there for about 20 minutes. The batteries were removed from the cool water tray and were recharged electrically.

The four (4) batteries were inspected and two were selected for testing in comparison with two new batteries. In each instance the batteries were paired and discharged through a small electric motor. The two new batteries maintained their rated e.m.f. value for 87 minutes of discharge time whereas the restored batteries of the invention maintained their e.m.f. value for 77 minutes of discharge time.

From the foregoing example it will be seen that the batteries which were restored in accordance with the process of the invention exhibited an operational longevity that compared reasonably with those of new batteries thereby demonstrating the efficacy of the process of the invention.

What is claimed is:

1. A process for the restoration of rechargeable nickel-cadmium batteries comprising:
    providing a reasonable clean expended nickel-cadmium battery;
    submersing said battery in boiling water and maintaining same in the boiling water for a period of time within the approximate range of from 15 to 20 minutes;
    removing the heated battery from the boiling water and immediately cooling same to approximately room temperature and then electrically recharging the cooled battery.

2. A process according to claim 1 wherein the battery is cooled by submersion in water which is maintained at a temperature below room temperature.

3. A process according to claim 1 wherein the temperature of the water into which the heated battery is submersed is maintained within the range of from 45° to 50° F. and the battery is kept in the water for approximately 20 minutes.

4. A process according to claim 1, wherein the battery is maintained within the boiling water for not more than 15 minutes.

* * * * *